United States Patent
Davies et al.

(10) Patent No.: US 8,413,541 B2
(45) Date of Patent: Apr. 9, 2013

(54) CLAMP ASSEMBLY FOR A STEERING COLUMN ASSEMBLY

(75) Inventors: Niclas Davies, Swansea (GB); Jan Havlicek, Sazavou (CZ)

(73) Assignee: TRW Limited, West Midlands (GB)

(*) Notice: Subject to any disclaimer, the term of this patent is extended or adjusted under 35 U.S.C. 154(b) by 0 days.

(21) Appl. No.: 12/682,636

(22) PCT Filed: Oct. 10, 2008

(86) PCT No.: PCT/GB2008/003431
§ 371 (c)(1),
(2), (4) Date: Jul. 13, 2010

(87) PCT Pub. No.: WO2009/047516
PCT Pub. Date: Apr. 16, 2009

(65) Prior Publication Data
US 2010/0275721 A1      Nov. 4, 2010

(30) Foreign Application Priority Data
Oct. 12, 2007 (GB) .................................. 0719971.4

(51) Int. Cl.
B62D 1/18 (2006.01)
B62D 1/00 (2006.01)
(52) U.S. Cl. .......................................... 74/493; 280/777
(58) Field of Classification Search .................. 74/493; 280/775, 777
See application file for complete search history.

(56) References Cited

U.S. PATENT DOCUMENTS

| | | | | |
|---|---|---|---|---|
| 5,787,579 | A * | 8/1998 | Takahashi et al. | 29/898.057 |
| 6,092,955 | A * | 7/2000 | Chartrain et al. | 403/283 |
| 6,092,957 | A | 7/2000 | Fevre et al. | |
| 7,721,620 | B2 * | 5/2010 | Matsui et al. | 74/493 |
| 7,752,940 | B2 * | 7/2010 | Lutz | 74/493 |
| 8,006,587 | B2 * | 8/2011 | Schnitzer et al. | 74/493 |
| 2009/0013817 | A1 * | 1/2009 | Schnitzer et al. | 74/493 |
| 2011/0041642 | A1 * | 2/2011 | Havlicek | 74/493 |

FOREIGN PATENT DOCUMENTS

| | | |
|---|---|---|
| EP | 1894812 A1 | 3/2008 |
| FR | 2768204 A1 | 3/1999 |
| FR | 2830504 A1 | 4/2003 |
| GB | 2415485 A | 12/2005 |
| WO | 2007058158 A1 | 5/2007 |

OTHER PUBLICATIONS

Great Britain Search Report, Application No. GB0719971.4 dated Feb. 8, 2008.

* cited by examiner

*Primary Examiner* — Justin Krause
(74) *Attorney, Agent, or Firm* — MacMillan, Sobanski & Todd, LLC

(57) ABSTRACT

A clamp assembly secures a fixed portion of a steering column assembly to a movable portion of a steering column. It comprises a rack of teeth carried by the moving portion and a rack of teeth carried by the fixed portion and an inner hollow toothed block nested inside an outer hollow toothed block, each carrying at least one rack of teeth with the rack of teeth on the inner block facing the rack of teeth on the moving portion and the rack of teeth on the outer block facing the rack of teeth on the fixed portion. A retaining clip provides a lost motion coupling between the retaining clip and the inner toothed block and an independent lost motion coupling between the retaining clip and the inner toothed block and an independent motion coupling between the retaining clip and the outer toothed block. First, second and third springs bias the teeth of the blocks into and out of engagement with the racks when locked and unlocked. The assembly helps prevent damage to the teeth with the springs permitting the damage force on the blocks to be independently absorbed.

14 Claims, 4 Drawing Sheets

CLAMP ASSEMBLY FOR A STEERING COLUMN ASSEMBLY

CROSS-REFERENCE TO RELATED APPLICATIONS

This application is a national stage of International Application No. PCT/GB2008/003431 filed Oct. 10, 2008, the disclosures of which are incorporated herein by reference in entirety, and which claimed priority to Great Britain Patent Application No. 0719971.4 filed Oct. 12, 2007, the disclosures of which are incorporated herein by reference in entirety.

BACKGROUND OF THE INVENTION

This invention relates to improvements in clamp assemblies for steering column assemblies, especially but not exclusively to electric power assisted steering assemblies. In particular it relates to clamp assemblies for steering column assemblies adjusted for both rake and reach.

It is known to provide a steering column assembly in which a steering wheel is connected to one or more road wheels through a collapsible or telescopic steering column shaft. The shaft is designed to collapse away from a driver of the vehicle if a load is applied to the steering wheel in the event of an accident. The shaft may comprise a single part shaft, which has a weakened central section that will concertina under an axial load. Alternatively it may comprise a two part telescopic shaft in which one part slides axially into the other under an axial load.

To locate the steering shaft relative to the vehicle it is typically supported within one or more bearings carried by an adjustable support portion, often referred to as a steering column shroud. The shroud is in turn secured to a fixed portion bolted or otherwise fixed to a conveniently accessible part of the vehicle chassis or bulkhead.

In many vehicles produced today the column shroud, which may for convenience be thought of as an adjustable portion, is releasably locked to the fixed portion of the vehicle in a way that permits the steering shaft to be adjusted for rake (up and down) and reach (in and out). A lever-which must be located within easy reach of the driver-allows a clamping mechanism to be locked and unlocked for the position of the steering column shroud to be adjusted. This enables the driver of the vehicle to set the steering wheel at the most comfortable position.

With the introduction of steering wheel mounted airbags there has recently been a demand that, once adjusted, the column must be held in place by a positive locking method. By this we mean that, when the clamp mechanism is moved into its locked position, there must be greater restraint against subsequent column movement for reach than would be created solely by friction.

It is normal to increase the resistance to movement by providing for a toothed engagement between the fixed portion and a clamp assembly and similarly between the clamp assembly and the adjustable portion. However, a basic problem with the use of teeth in this way is that on occasions the tips of the teeth on one part may be exactly in line with the tips of the teeth that should engage them when the driver attempts to move the clamp to the locked position. This so called tooth-on-tooth problem can either prevent the driver locking the clamp properly or in extreme cases damage the teeth or the locking mechanism.

BRIEF SUMMARY OF THE INVENTION

According to a first aspect the invention provides a clamp assembly for securing a fixed portion of a steering column assembly to a movable portion of a steering column, the clamp assembly including one or more of the following features:

a rack of teeth carried by the moving portion and a rack of teeth carried by the fixed portion, a clamp pin which passes through an opening in the fixed portion and an opening in the moving portion, an inner hollow toothed block and an outer hollow toothed block, each carrying at least one rack of teeth with the rack of teeth on the inner block facing the rack of teeth on the moving portion and the rack of teeth on the outer block facing the rack of teeth on the fixed portion, the inner toothed block being mounted onto the clamp pin so that it can move to and fro along the pin and the outer toothed block being mounted on the inner toothed block such that the outer block can move to and fro along the inner block;

a clamping means mounted on an end of the clamp pin, a clamp block mounted on the pin between the clamping means and the inner and outer blocks and which is biased into engagement with the fixed portion by the clamping means when the assembly is locked, a first spring which acts between the clamping means and the fixed portion to release the clamping means from the fixed portion when the assembly is unlocked;

a retaining clip having a first part fixed relative to the clamp block and a second part, spaced from the first part, which provides a lost motion coupling between the retaining clip and the inner toothed block and an independent lost motion coupling between the retaining clip and the outer toothed block such that the second part engages both the inner block and outer block when the assembly is unlocked but both inner and outer blocks can independently move away from the second part when the assembly is locked, a second spring which acts between the clamp block and the inner block to bias the inner block into engagement with the second part of the retaining clip when the assembly is unlocked and also to bias the teeth of the inner block into engagement with the teeth of the moving portion when the assembly is locked, and a third spring which acts between the clamp block and the outer block to bias the outer block into engagement with the second part of the retaining clip when the assembly is unlocked and also to bias the teeth of the outer block into engagement with the teeth of the fixed portion when the assembly is locked.

This assembly is advantageous because both inner and outer blocks are sprung, and some lost motion is provided between the inner/outer blocks and the retaining clip of the clamp block. The assembly can therefore help prevent tooth damage in a tooth on tooth event by allowing the potentially damaging forces to be absorbed by the springs whilst ensuring that the racks of teeth engage as soon as the racks move out of the tooth on tooth position due to the biasing of the second and third springs. Because the inner and outer blocks are independently retained by the retaining clip, second/third springs and clamp block it is possible for one rack of teeth to absorb a tooth on tooth event whilst the other racks(s) of teeth can still fully engage.

The amount of lost motion or "free play" between the second part of the retaining clip and the inner and outer blocks should be equal to, or slightly greater than the heights of the teeth on the inner block and the teeth on the moving portion.

The clip may have a first part which is fixed relative to the clamp block because it is biased towards the clamping block by the first spring and which is mounted on the clamp pin sandwiched between the inner and outer blocks and the clamping block.

The second part of the retaining clip may comprise at least two hooked arms, one hooked arm engaging the outer block and the other engaging the inner block. Preferably, the second part comprises at two pairs of arms, one pair engaging the outer block and the other the inner block. The hooks may engage a shelf defined in the blocks which faces away from the first part of the retaining means.

The hooked arms may be located within grooves provided in inner block and outer block. This protects the arms from damage.

The second part of the clip serves to draw the toothed blocks away from the fixed and moving portions as the assembly moves to the unlocked position under the action of the first spring.

The retaining clip may be formed as part of the clamping block or clamping means if a separate element is undesirable in a given application.

The clamping block may have a base portion slidingly mounted onto the clamp pin and one or more arms which extend out to react against the fixed rack portion when the assembly is locked. These arms may extend around the outside of the outer block.

The clamping block may be at least partially sandwiched between the clamping means and the first spring but it may be integral with the clamp means. The first spring functions to push the clamping block free of the fixed rack portion when the assembly is unlocked.

One or more, and preferably all of the first spring, second spring and third spring may be combined as a single element. Again this keeps the number of separate parts low. This may comprise a pressed metal part comprising three springs connected by a web. The web may include an opening through which the clamp pin passes and may be sandwiched between the inner block and the clamp mechanism. The springs may be compression springs.

The inner block may be nested within the outer toothed block so that the outer toothed block is supported and guided through its movement by a sliding engagement with the inner block, the inner block having a sliding engagement with the clamp pin. The outer block may therefore be hollow. There may be a sliding engagement between the outwardly facing surface of the inner block and the inwardly facing surface of the outer block. The inner block may therefore prevent any significant movement of the outer block other than in a direction parallel to the axis of the clamp pin, i.e. towards and away from the fixed rack portion. It may be possible, nevertheless for both the inner and outer blocks to be guided by the clamp pin, with the inner block not guiding the outer block, or only providing some additional guiding of the outer block.

The inner toothed block may be slidingly mounted onto the clamp pin. It may be a snug fit. Of course, if preferred a liner of low friction material may be located between the two if desired. A similar friction liner may be provided between the inner block and the outer block.

The inner block and outer block may be generally cuboid in shape, each having a central through bore for locating on the other block/clamp pin.

The skilled person will appreciate that the parts of the assembly may be so constructed and arranged that in a locked position the second and third springs normally bias the teeth of the inner and outer blocks at least partially into engagement (and preferably fully into engagement) with the corresponding teeth on the moving rack portion yet the springs can be deformed to accommodate a tooth on tooth situation of the racks with the clamp bracket maintaining the frictional engagement with the fixed part or moving part.

In the arrangement of the invention, in the event of a tooth on tooth the clamp bracket engagement gives a positive locking feel and some frictional engagement to prevent accidental movement of the steering column. In the event of a crash force causing movement, the second spring will force the racks of teeth into engagement as soon as the tooth on tooth situation is overcome.

The moving rack portion may comprise a part of a guide rail secured to a steering column shroud. The fixed part may comprise a guide bracket secured to the vehicle. The moving rack portion may be located on the opposite side of the fixed rack portion to the inner and outer blocks. In this case the term fixed means that the rack is fixed in position relative to the vehicle. Other arrangements are conceivable in which the fixed portion may be fixed relative to the shroud, and in fact move relative to the vehicle.

The slot in the moving rack portion may be elongated and have a major axis aligned with a direction of movement of the shroud for reach. The clamp pin may therefore be free to move along this slot when the clamp mechanism is unlocked and prevented from moving by the co-operating teeth when locked.

The slot in the fixed rack portion may also be elongated but have a major axis aligned with a direction of movement of the shroud for rake angle. The clamp pin may therefore be free to move along this slot when the clamp mechanism is unlocked and prevented from moving by the co-operating teeth when locked. The slot may be provided such that the inner toothed block can reach through it to make contact with the rack of teeth on the moving rack portion.

The slot in one portion may be generally orthogonal to the slot in the other.

The clamp means may comprise a fixed stop located on the end of the clamp pin. It may include additional components. For example, it may comprise a stop on one side of the fixed and adjustable rack portions and a fixed stop on the other side of those portions, and a cam and a cam follower located between one stop and the fixed and adjustable portions.

A lever may be provided for operating the clamp mechanism between a locked and unlocked position.

The teeth of the racks on the fixed and moving portions may comprise saw teeth. The flank pressure angle used with typical symmetrical tooth shapes would cause the teeth to be thrown out of mesh as soon as they had to transmit a high load in a crash. Providing saw teeth shapes in which the sides of the teeth which carry the crash forces are almost vertical and the non-load carrying sides are relatively shallow overcomes this potential problem. Of course, a consequence of this is that the positive locking only functions in one Rake direction (up) and one Reach direction (forward). However, these are the directions which matter for crash. The opposite directions are adequately held by friction alone between the clamp block and the fixed portion.

According to a second aspect the invention provides a steering column assembly including an adjustable steering column shroud and a support bracket and a clamp mechanism according to a first aspect of the invention, the fixed rack portion being secured to the bracket and the moving rack portion being secured to the shroud.

Other advantages of this invention will become apparent to those skilled in the art from the following detailed description of the preferred embodiment, when read in light of the accompanying drawings.

DETAILED DESCRIPTION OF THE INVENTION

Figure 1:
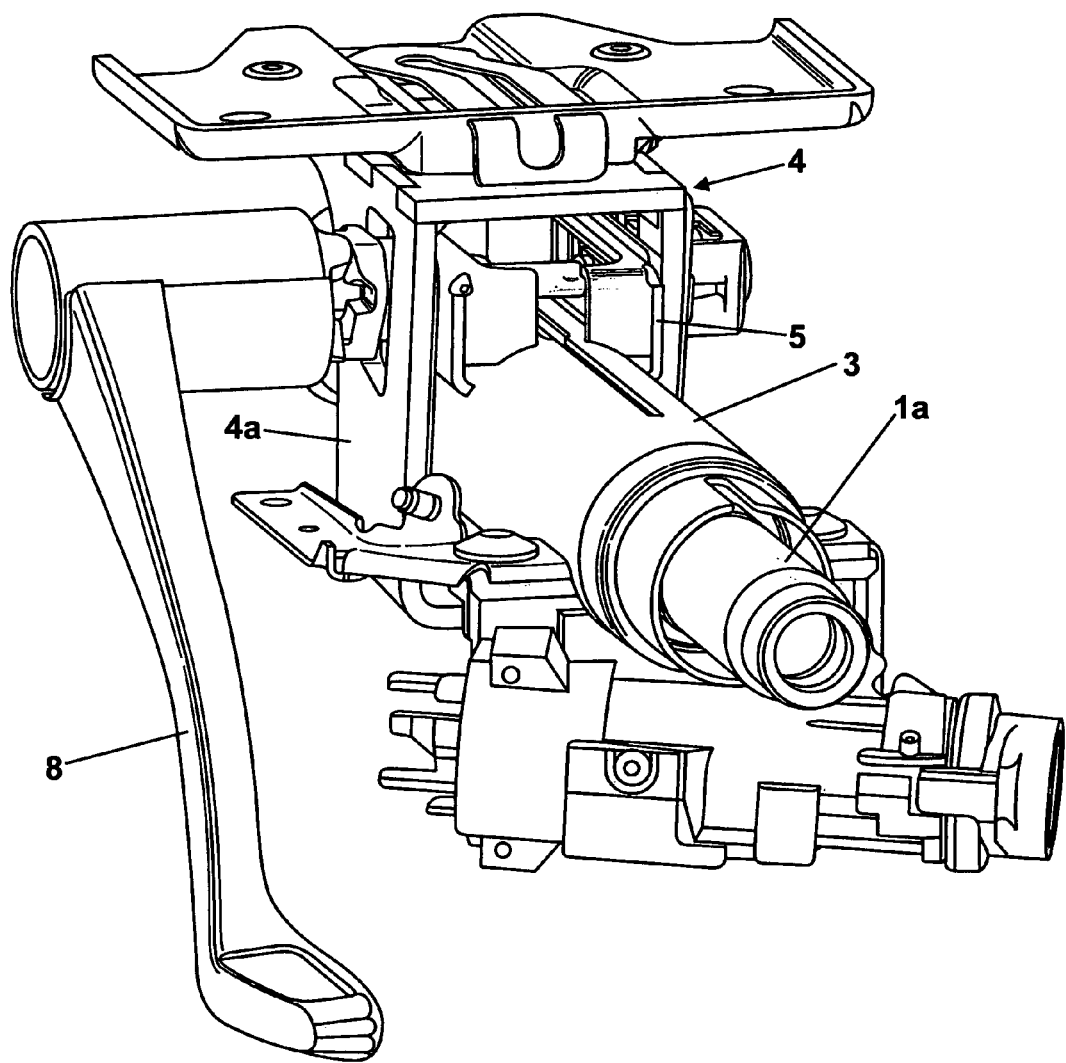
FIG. 1 is a first perspective view of an embodiment of a steering column assembly which incorporates a clamp assembly according to a first aspect of the invention.
Figure 2:
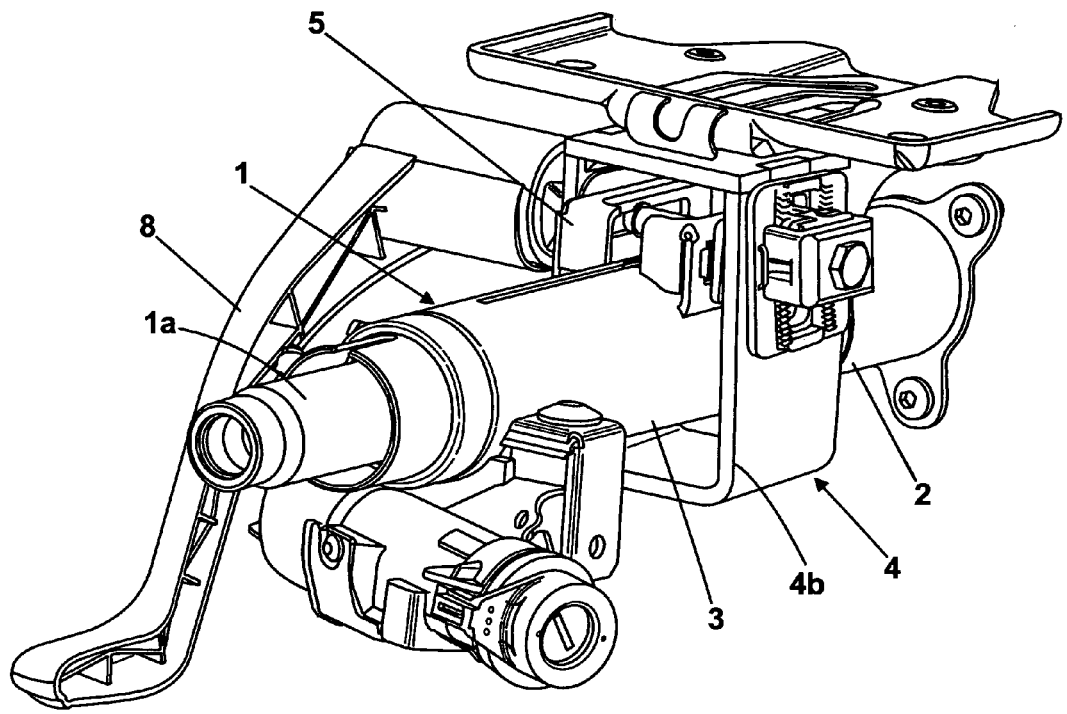
FIG. 2 is a second, alternative, perspective view of the embodiment of FIG. 1.
Figure 3:
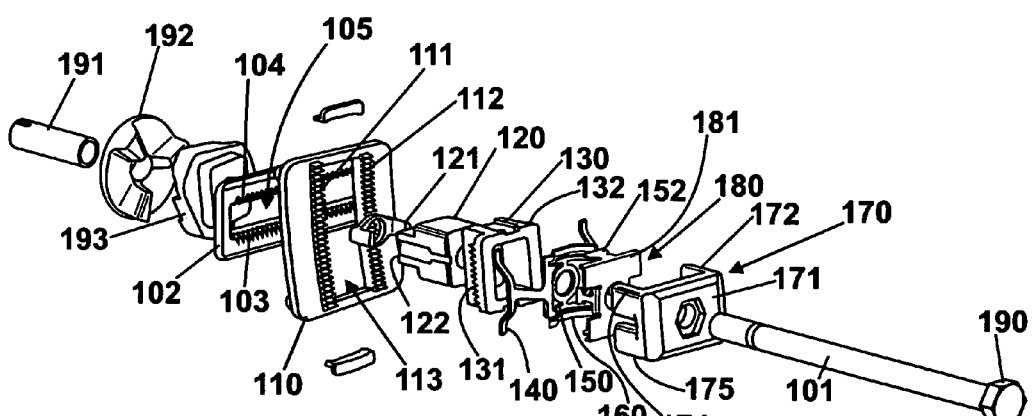
FIG. 3 is an exploded view of the component parts of the clamp assembly shown in FIG. 1 prior to assembly.
Figure 4:
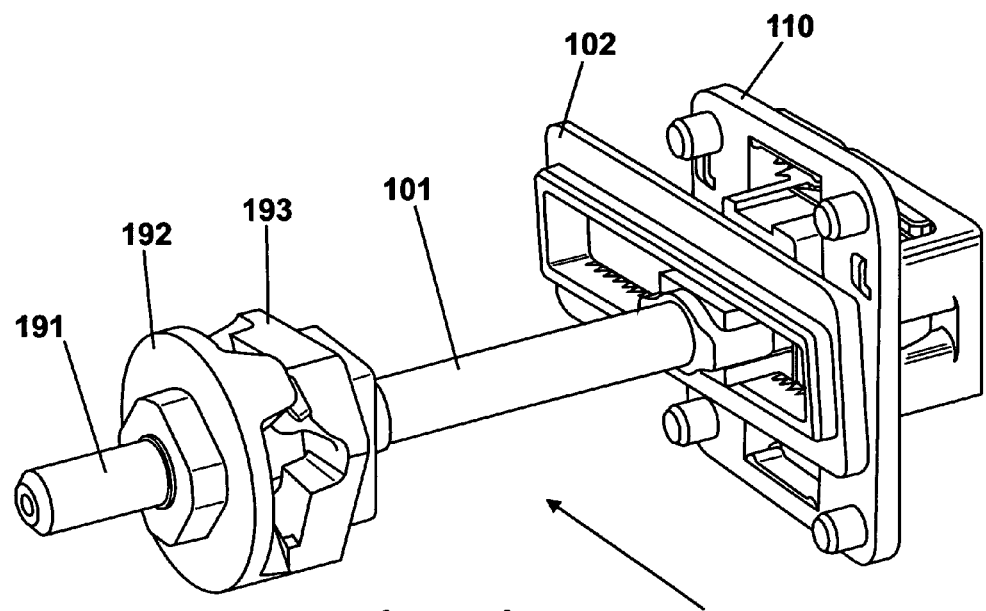
FIG. 4 is a perspective view illustrating the relationship between the parts of the clamp assembly when assembled.
Figure 5:
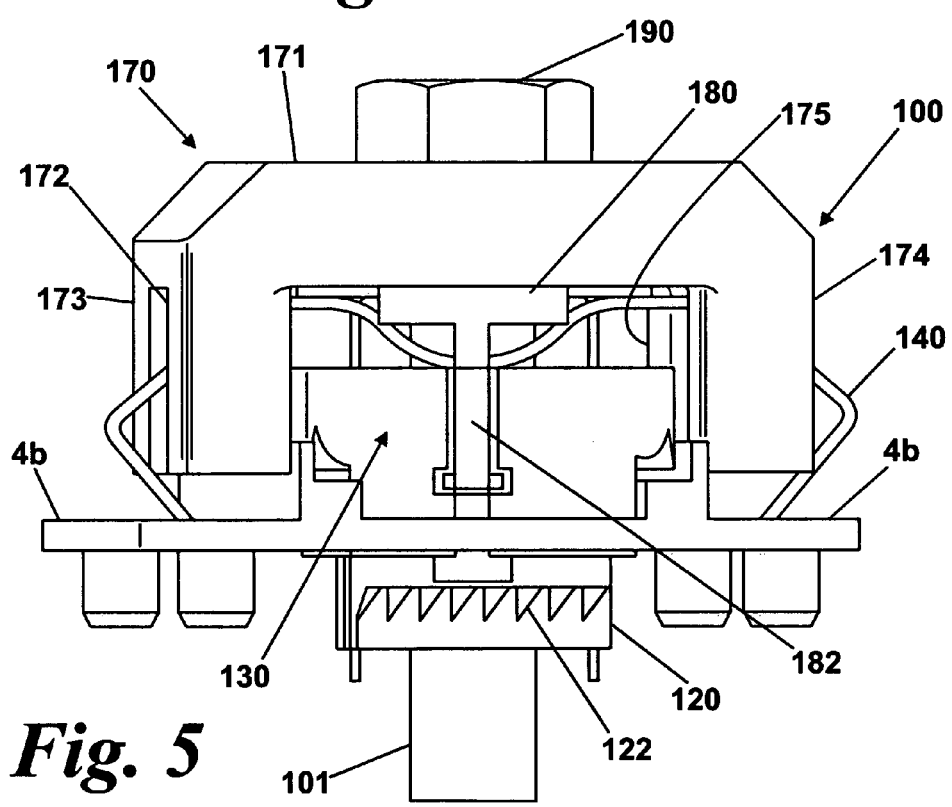
FIG. 5 is a view in cross section of the clamp assembly in a locked position.

An embodiment of a steering column assembly for a vehicle which incorporates a clamp assembly according to a first aspect of the invention is shown in FIGS. 1 and 2 of the accompanying drawings. It comprises a telescopic steering column shroud having an upper portion 3 and a lower portion 2 that fits around a telescopic steering shaft (1a as shown in FIGS. 1 and 2). The upper portion 3, referred to herein as a moving portion, can slide up and down the lower portion to enable the length of the shroud to be adjusted.

The movement of the moving portion 3 is achieved by supporting it within two downwardly extending arms 4a, 4b of a support bracket 4. The bracket 4 will be referred to herein after as the fixed portion, being considered fixed in that it is fixed relative to the vehicle body (not shown). The moving portion 3 is reinforced by a box section rail 5 welded to it to prevent it collapsing and this box section 2 fits snugly between the two arms 4a,4b of the bracket 4.

Figure 6:
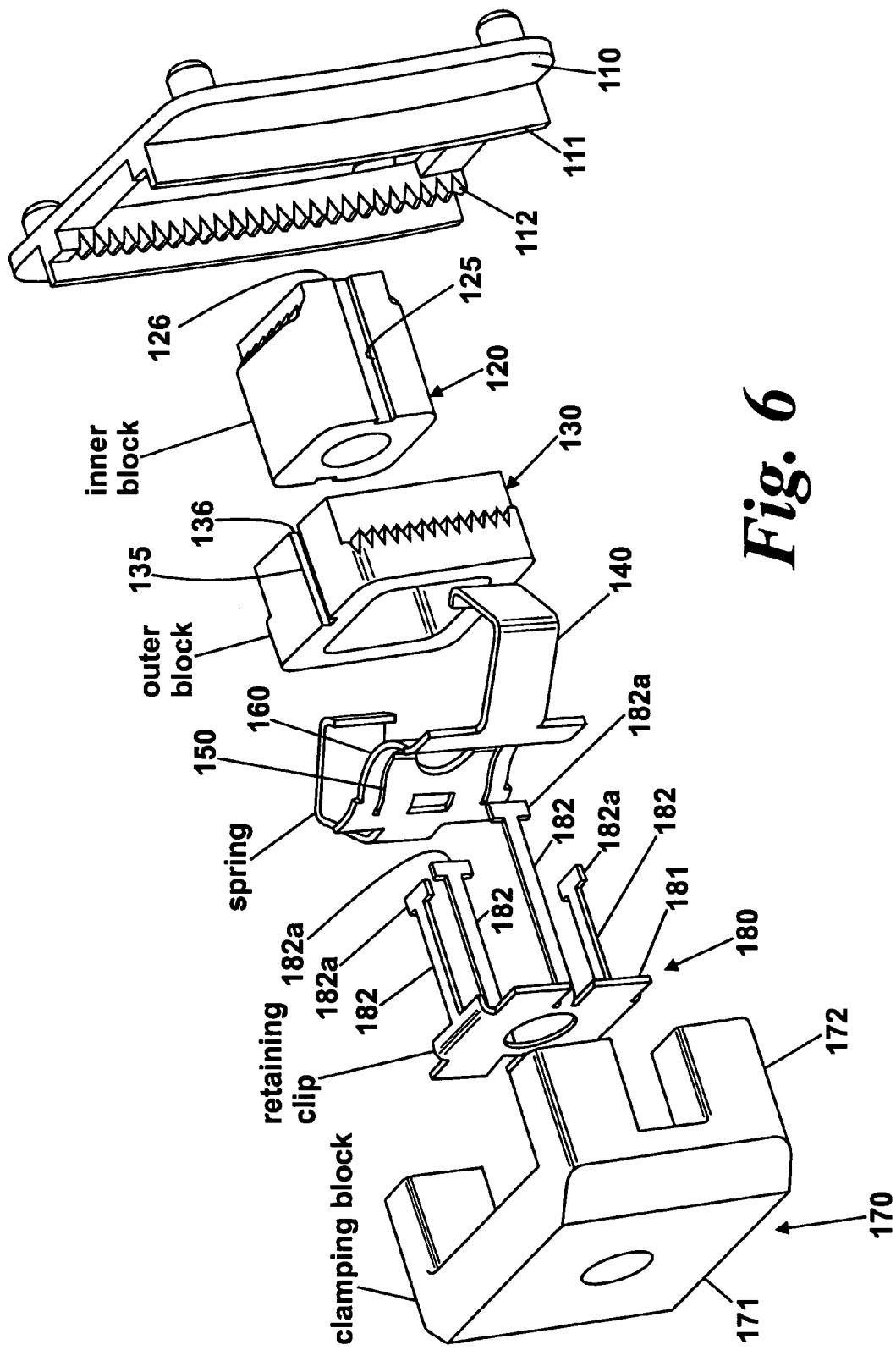
FIG. 6 is an alternative exploded view of some of the parts of the clamping assembly.

The moving portion (including the rail 5) and fixed portion (bracket 4) are held together by a clamp assembly. This is visible in FIGS. 1 and 2, but can better be seen in FIGS. 3 through 6 of the accompanying drawings. Note that FIG. 6 shows only some of the parts of the assembly.

The clamp assembly is releasable so that the position of the moving portion of the steering column shroud, and hence steering wheel, can be adjusted. When locked the assembly prevents any relative movement between them although in some cases this could be overcome, for example in the event of an accident.

The clamp assembly 100 comprises a clamp pin 101 that extends through an elongate opening or slot in each of the bracket arms 4a,4b and an elongate opening or slot in opposing sides of the rail on the adjustable member 1. The slots in the rail 5 are aligned with the axis of rotation of the steering shaft and the clamp pin 101 can move along these slots when the clamp assembly is unlocked. This permits reach adjustment. The slots in the bracket 4 are roughly orthogonal to the slots in the rail, and the clamp pin can move along those to make rake adjustments when the clamp assembly is unlocked.

To positively lock the shroud in place, a toothed rack is provided alongside a slot in one side of the rail 5. This is provided by a stamped member 102 which carries two racks 103, 104 located either side of a slot 105 in the member 102. The slot is aligned with the slot in the rail. Of course, it may be possible to make the racks an integral part of the rail, perhaps by stamping or pressing them into the rail.

A similar member 110 is attached to the bracket 4. This includes two racks 111, 112 located either side of a slot 113 in the member. The member 110 is fixed to the bracket 4 so that the slot coincides with the slot in the bracket. Note that these slots are relatively wide so that the racks of teeth 103, 104 are visible and accessible through the slot.

The racks of teeth on the members 110, 102 comprise saw teeth in which the sides of the teeth which carry the crash forces are almost vertical and the non-load carrying sides are relatively shallow.

The clamp pin 101 carries two toothed blocks 120, 130, one nested inside the other. An inner toothed block 120 is slidingly mounted on the pin so that it can move to and fro along the pin. The inner block 120 carries two racks of teeth 121, 122 which oppose the racks of teeth 103, 104 on the member 102 secured to the rail. The part of the block carrying these teeth extend through the slot in the member 110 to enable the racks of teeth 103, 104, 121, 122 to engage or disengage.

An outer toothed block 130 is slidingly mounted on the inner block so that it can also move to and fro in a direction parallel to the axis of the block whilst being guided by the inner block 120. This outer toothed block 130 carries two racks of teeth 131, 132 which oppose the racks of teeth 111, 112 on the member 110 secured to the bracket 4. The movement to and fro of the outer member enables the racks of teeth 111, 112, 131, 132 to engage and disengage. Notably, the inner block does not provide a limit to the amount of relative movement between the inner and outer blocks. This allows the teeth on the outer block to engage the teeth on the member 110 even if the teeth on the inner block jam against the teeth on the member 102 (and vice versa) during a so called tooth on tooth event. As will become apparent, when the clamp assembly is locked the racks of teeth all mesh together to provide positive locking for both reach and rake.

The clamp assembly includes a mechanism for moving the inner and outer blocks 102, 130 to and fro along the pin towards and away from the fixed and moving portions during locking and unlocking. This is achieved by a clamp means mounted on the pin 101, various springs 140, 150, 160, a block 170 and a retaining clip 180.

A stop 190 in the form of a bolt head is provided at one end of the shaft 101 and another stop 191, which could be a stiff nut, and a cam/follower mechanism 192, 193 at the other. The cam/follower mechanism working with the stops 190, 191 forms a clamp mechanism which can squeeze the bracket arms 4a, 4b together onto the rail 5, and also press the blocks 120, 130 towards the rail 5 and bracket 4.

The cam mechanism comprises a cam portion 192 that is mounted on the clamp pin 101. Attached to this is an adjustment handle 8 that can be seen in FIGS. 1 and 2. The cam portion 192 is rotatably mounted to the clamp pin 101 so that it can be rotated by moving the handle 8, and carries a ramped cam face which abuts a corresponding ramped cam face provided on a fixed cam portion 193. The fixed cam portion 193 is secured to the shaft in such a manner that it cannot rotate but can move to and fro along the shaft. The overall length of the combination of fixed and moving cams on the shaft varies as the handle turns.

A clamp block 170 is mounted on the clamp pin 101 between the stop 190 and the inner and outer toothed blocks 120, 130. This block 170 has a base portion 171 through which the clamp pin is threaded, and which is sandwiched between the stop 190 and the inner/outer blocks 120, 130. It also includes four arms 172, 173, 174, 175 which reach out from the base 171 around the outer block 130 towards the bracket arm 4b. When the clamp assembly is locked, the clamp means—in this case the stop 190 pulled by the pin 101 under the action of the cam mechanism-presses the arms 172, 173, 174, 175 of the clamp block 170 into engagement with the guide bracket arm 4b. The arms therefore bear at least some of the clamp load onto the bracket.

A first spring 140 acts between the clamp bracket 170 and the guide bracket arm 4b to bias the clamp bracket 170 away from the bracket arm 4b when the assembly is unlocked. When it is locked, this spring 140 is compressed.

A second spring 150 is also provided which acts between the clamp bracket 170 and the inner block 120 to bias the inner block 120 away from the clamp bracket 170. A third spring 160 acts between the clamp bracket 170 and the outer block 130 to bias the outer block 130 away from the clamp bracket 170. As shown, all three springs 140, 150 and 160 are provided by a single pressed metal component, a web connecting them and providing a mount for the springs on the clamp pin. The web is sandwiched between the inner/outer blocks and the clamp block 170.

Finally, a retaining clip 180 is also provided which provides a lost motion coupling between the clamping block 170 and the inner toothed block 120 and a similar lost motion coupling between the clamping block 170 and the outer toothed block 130. The retaining clip in this example is formed by stamping a flat sheet of metal into a shape having a square central web 181 and four arms 182 which extend outward each side of the web. Each arm has a hooked end. The arms are then bent through 90 degrees so they all extend away from the web 181, in the same direction. A hole in the centre of the web 181 allows it to be mounted on the clamp pin sandwiched between the clamp block and the inner/outer blocks.

The arms 182 on opposing sides of the web form two arm pairs. One pair of arms extends from the web around the inner block. Each of these arms is located within a groove 125 in the inner block 120 to protect it from damage, and the hook 182a on the end of each arm engages a shelf 126 at the end of the groove. The inner block 120 is pressed away from the web by the second spring until the hook 182a engages the groove. In this position, the inner block is spaced from the web by a small distance equal to the height of the teeth to give an amount of lost motion.

Similarly, one pair of arms extends from the web around the outer block 130. Each of these arms is located within a groove 135 in the outer block 130 to protect it from damage, and the hook on the end of each arm engages a shelf 136 at the end of the groove 135. The outer block 130 is pressed away from the web by the third spring until the hook engages the groove. In this position, the outer block is spaced from the web by a small distance equal to the height of the teeth to give an amount of lost motion.

The range of lost motion permitted by the hooked arms of the retaining clip is normally taken up by the second and third springs, both when clamped and unclamped. As will become apparent, in a tooth on tooth event this lost motion enables the inner and outer members to lift off the hooks and move towards the web of the retaining clip, and hence the clamp block, as the second and/or third springs are compressed. The amount of lost motion or "free play" in this example is slightly greater than the heights of the teeth on the inner block and outer block. The total travel of the clamp block between locked and unlocked positions should be chosen so that it exceeds the amount of lost motion provided by the retaining clip. This ensures that the toothed racks always disengage when the assembly is unlocked.

The function of the retaining clip is to provide a limit for the second and third springs, and also to pull the inner and outer blocks away from the guide bracket arm 4b and rail 5 so that the toothed racks disengage as well as allowing some relative movement between the blocks 120, 130 and 170.

In use, when the assembly is unlocked, the cam mechanism is released which allows the first spring 140 to press the clamp block 170 away from the guide bracket arm 4b. This in turn acts on the retaining clip 180, the arms 181 of which pull the inner and outer blocks 120, 130 away from the guide bracket arm 4b to disengage all the racks. The second and third springs push the toothed blocks 120, 130 away from the clamp block 170 and stop 190, but the retaining clip 180 limits this to an amount of travel less than the travel of the clamp block 170 between locked and unlocked positions so clearance of the racks is assured.

When locked, the cam mechanism causes the stop 190 to push the clamp block 170 back towards the guide bracket arm 4b until the arms 172, 173, 174, 175 of the clamp block 170 engage the guide bracket arm 4b. This engagement provides a positive force path from the cam mechanism through the block to the guide bracket. The second and third springs 150, 160 in this position will press the inner and outer blocks 120, 130 towards the member 102 and member 110 respectively so that the racks of teeth on the blocks engage fully with the racks of teeth on the members 102, 110. Positive locking against rake and reach adjustment is therefore assured.

In some cases, on moving from the unlocked position to the locked position the tips of the teeth on one rack may strike the tips of the teeth on a corresponding rack. For example, the tips of the teeth on the inner block 120 may strike the tips of the teeth on the rack secured to member 102 secured to the rail 5. This is known as a tooth on tooth event and in such an event there is a risk of damage to the teeth in excessive clamping forces are applied to the teeth. Whether or not a tooth on tooth event occurs depends on where the driver has placed the adjustable member 1.

In such an event, the clamp block 170 will still effectively clamp against the guide bracket, whilst the second or third springs 150, 160 and lost motion in the retaining clip 180 will allow some relative movement of the inner or outer block 120, 130 and the clamp block 170 to prevent excessive force being applied to the teeth. The teeth will not engage and so on completion of locking a positive lock will not have been achieved. Friction between the clamp block arms and the guide bracket arm will provide some clamping and prevent unwanted movement of the shroud for relatively low forces.

In the event of a crash, the racks may become displaced. As this occurs, the tooth on tooth event will be overcome and the teeth tips will no longer be aligned. The second or third spring will then push the teeth of the racks into engagement to give the positive locking needed to resist more movement.

In accordance with the provisions of the patent statutes, the principal and mode of operation of this invention have been explained and illustrated in its preferred embodiment. However, it must be understood that this invention may be practiced otherwise than as specifically explained and illustrated without departing from its spirit or scope.

The invention claimed is:

1. A clamp assembly for securing a fixed portion of a steering column assembly to a movable portion of a steering column comprising:
   a rack of teeth carried by said moving portion and a rack of teeth carried by said fixed portion,
   a clamp pin which passes through an opening in said fixed portion and an opening in said moving portion,
   an inner hollow toothed block and an outer hollow toothed block, each carrying at least one rack of teeth with said at least one rack of teeth on said inner hollow toothed block facing said rack of teeth on said moving portion and said at least one rack of teeth on said outer hollow toothed block facing said rack of teeth on said fixed portion, said inner hollow toothed block being mounted onto said clamp pin so that said inner hollow toothed block is movable to and fro along said clamp pin and said outer hollow toothed block being mounted on said inner hollow toothed block such that said outer hollow toothed block is movable to and fro along said inner hollow toothed block;

a clamping means mounted on an end of said clamp pin, a clamp block mounted on said clamp pin between said clamping means and said inner hollow toothed block and said outer hollow toothed block and which is biased into engagement with said fixed portion by said clamping means when said clamp assembly is locked, a first spring which acts between said clamping means and said fixed portion to release said clamping means from said fixed portion when said clamp assembly is unlocked;

a retaining clip having a first part fixed relative to said clamp block and a second part, spaced from said first part, which provides a lost motion coupling between said retaining clip and said inner hollow toothed block and an independent lost motion coupling between said retaining clip and said outer hollow toothed block such that said second part engages both said inner hollow toothed block and said outer hollow toothed block when said clamp assembly is unlocked but both said inner hollow toothed block and said outer hollow toothed block independently move away from said second part when said clamp assembly is locked, a second spring which acts between said clamp block and said inner hollow toothed block to bias said inner hollow toothed block into engagement with said second part of said retaining clip when said clamp assembly is unlocked and also to bias said at least one rack of teeth of said inner hollow toothed block into engagement with said rack of teeth of said moving portion when said clamp assembly is locked, and a third spring which acts between said clamp block and said outer hollow toothed block to bias said outer hollow toothed block into engagement with said second part of said retaining clip when said clamp assembly is unlocked and also to bias said at least one rack of teeth of said outer hollow toothed block into engagement with said rack of teeth of said fixed portion when said clamp assembly is locked.

2. A clamp assembly according to claim 1 wherein said retaining clip has a first part which is biased towards said clamp block by said first spring and which is mounted on said clamp pin sandwiched between said inner hollow toothed block and said outer hollow toothed block and said clamp block.

3. A clamp assembly according to claim 1 wherein said second part of said retaining clip comprises at least two hooked arms, a first one of said at least two hooked arms engaging said outer hollow toothed block and a second one of said at least two hooked arms engaging said inner hollow toothed block.

4. A clamp assembly according to claim 3 wherein said at least two hooked arms are located within respective grooves provided in said inner hollow toothed block and said outer hollow toothed block.

5. A clamp assembly according to claim 1 wherein said clamp block has a base portion slidingly mounted onto said clamp pin and at least one arm which extends out to react against said rack of teeth of said fixed rack portion when said clamp assembly is locked.

6. A clamp assembly according to claim 5 wherein said clamp block is at least partially sandwiched between said clamping means and said first spring.

7. A clamp assembly according to claim 1 wherein at least two of the first spring, second spring and third spring are combined as a single element.

8. A clamp assembly according to claim 7 wherein said single element comprises three springs connected by a web which includes an opening through which said clamp pin passes, said three springs comprising compression springs.

9. A clamp assembly according to claim 1 wherein said outer hollow toothed block is supported and guided for movement by a sliding engagement with said first member.

10. A clamp assembly according to claim 1 wherein said moving portion comprises a part of a guide rail secured to a steering column shroud and said fixed portion comprises a guide bracket secured to a vehicle, said moving portion being located on an opposite side of said fixed rack portion to said inner hollow toothed block and said outer hollow toothed block.

11. A clamp assembly according to claim 10 wherein said opening in said moving portion has a major axis aligned with a direction of movement of said steering column assembly for reach and said opening in said fixed portion has a major axis aligned with a direction of movement of said steering column assembly for rake angle.

12. A clamp assembly according to claim 1 wherein said clamp means comprises a fixed stop located on an end of said clamp pin.

13. A clamp assembly according to claim 1 wherein said rack of teeth of said fixed portion and said rack of teeth of said moving portion comprise saw teeth having shapes in which sides of the teeth which carry crash forces are generally vertical and non-load carrying sides of the teeth are shallow.

14. A steering column assembly including an adjustable steering column shroud, a support bracket and a clamp assembly according to claim 1 in which said fixed portion is secured to said support bracket and said moving portion is secured to said adjustable steering column shroud.

* * * * *

UNITED STATES PATENT AND TRADEMARK OFFICE
CERTIFICATE OF CORRECTION

| | | |
|---|---|---|
| PATENT NO. | : 8,413,541 B2 | Page 1 of 1 |
| APPLICATION NO. | : 12/682636 | |
| DATED | : April 9, 2013 | |
| INVENTOR(S) | : Niclas Davies et al. | |

It is certified that error appears in the above-identified patent and that said Letters Patent is hereby corrected as shown below:

On the Title Page:

The first or sole Notice should read --

Subject to any disclaimer, the term of this patent is extended or adjusted under 35 U.S.C. 154(b) by 202 days.

Signed and Sealed this
Ninth Day of July, 2013

Teresa Stanek Rea
*Acting Director of the United States Patent and Trademark Office*